United States Patent
Bulgin

[15] 3,673,361
[45] June 27, 1972

[54] PLUG SOCKET FOR USE IN A DISTRIBUTOR SYSTEM FOR ELECTRICAL POWER

[72] Inventor: Reginald W. Bulgin, 16 Cook St., Caringbah, New South Wales, Australia

[22] Filed: May 4, 1970

[21] Appl. No.: 34,004

[30] Foreign Application Priority Data

May 7, 1969 Australia ..............................54560/69

[52] U.S. Cl........................................200/51.03, 200/51.17
[51] Int. Cl.........................................................H01r 19/50
[58] Field of Search..................................200/51.02–51.06, 200/51, 13, 51.17; 174/59, 60; 339/22 R, 154, 164 M

[56] References Cited

UNITED STATES PATENTS

| | | | |
|---|---|---|---|
| 2,632,786 | 3/1953 | Hammerly | 339/157 |
| 2,714,713 | 8/1955 | Parajon | 339/154 |
| 3,246,179 | 4/1966 | Berner | 200/51.02 |

Primary Examiner—David Smith, Jr.
Attorney—Emory L. Groff and Emory L. Groff, Jr.

[57] ABSTRACT

A plug socket for use in a distributor system for electrical power having at least five internal terminal members for joining two multi-conductor cables, the terminal members being selectively engageable by plug pins inserted into the socket and at least one of the terminal members including switch means to disconnect a conductor of one cable from its corresponding conductor in the other cable.

7 Claims, 8 Drawing Figures

3,673,361
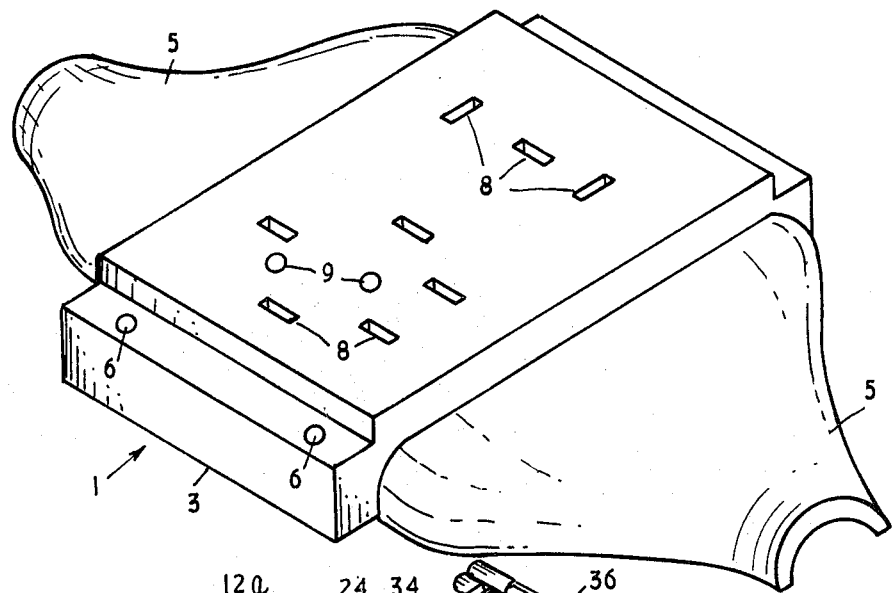
FIG. 1.
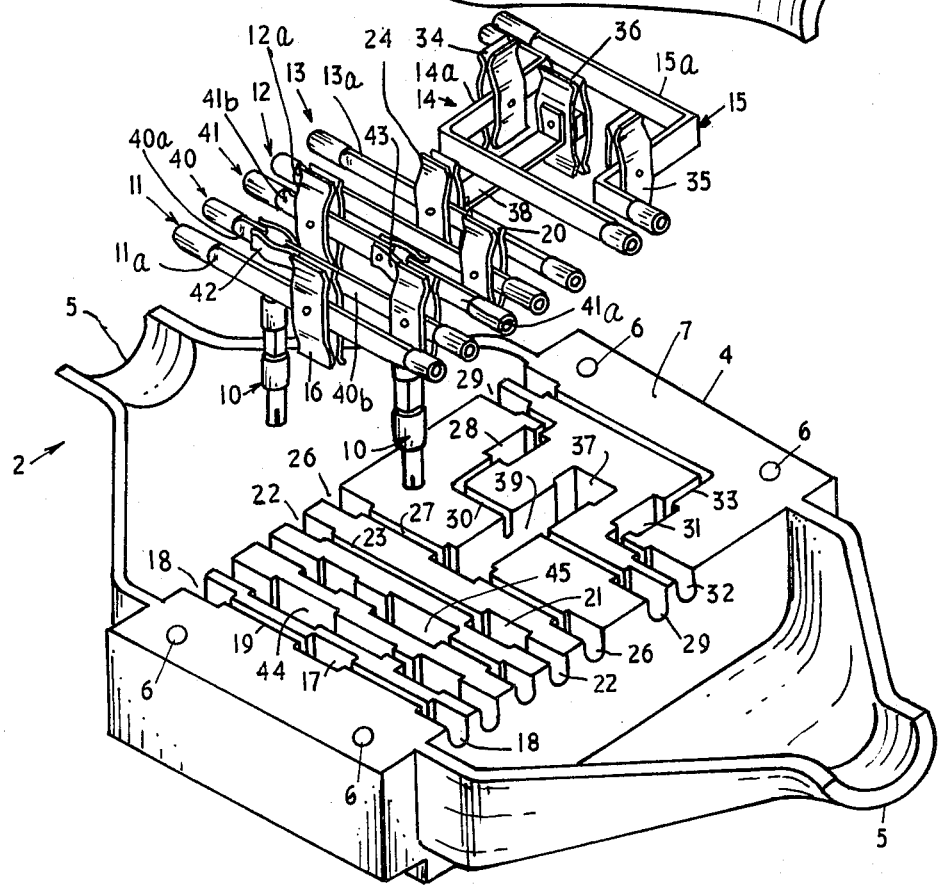
FIG. 3.
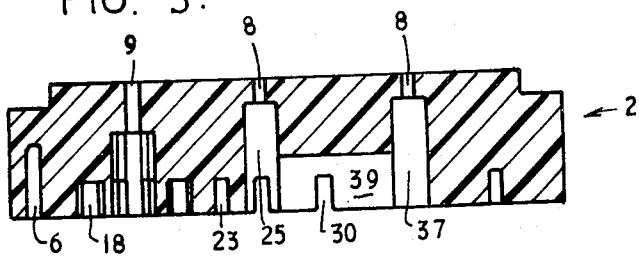
INVENTOR
REGINALD W. BULGIN
By Emory L. Groff Atty

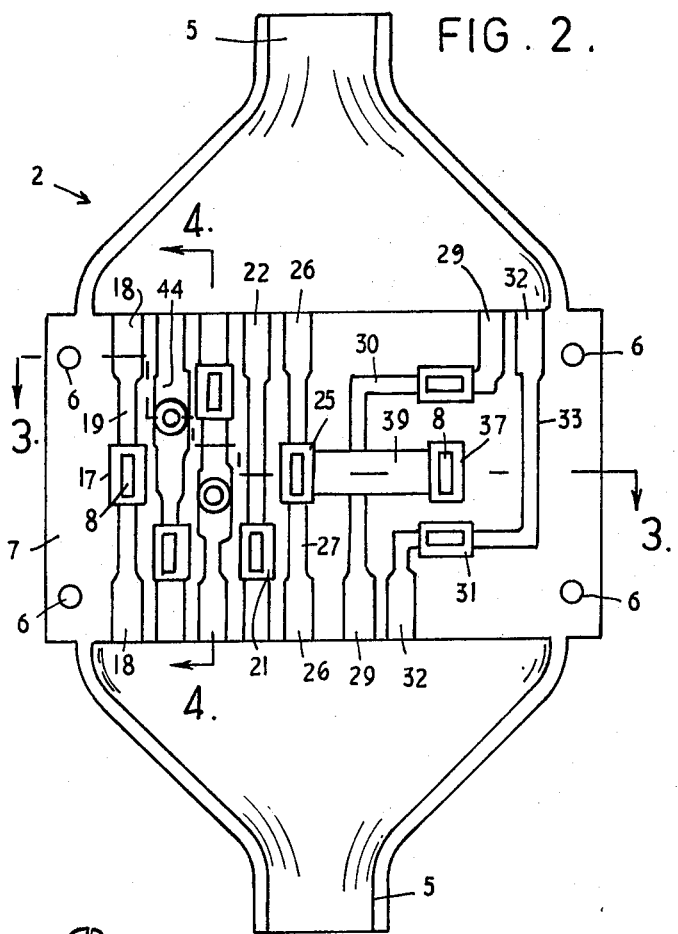
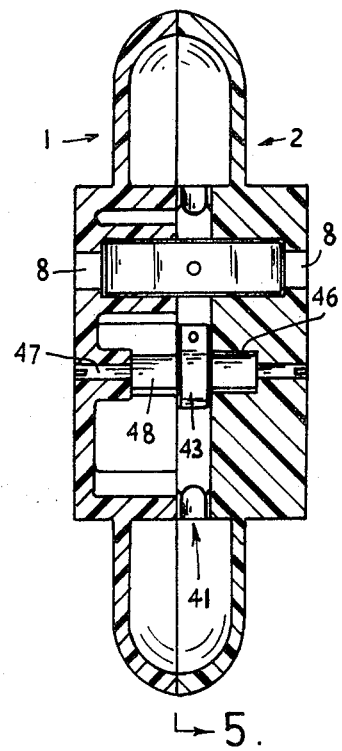
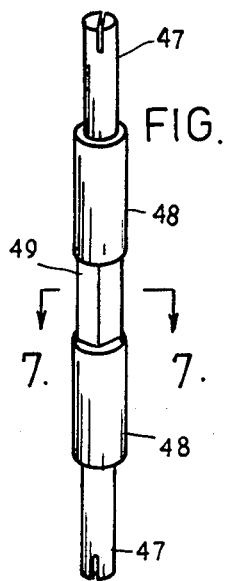
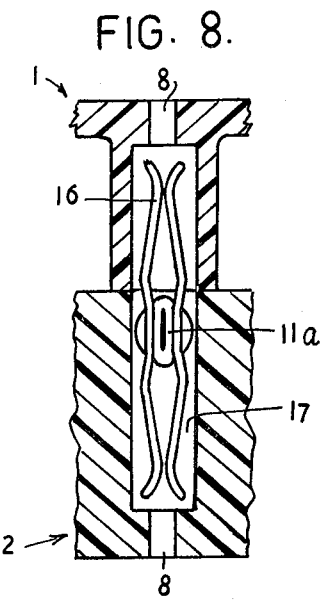
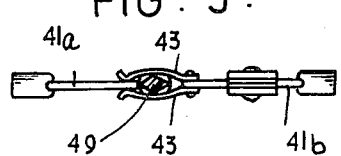

PLUG SOCKET FOR USE IN A DISTRIBUTOR SYSTEM FOR ELECTRICAL POWER

It is highly desirable in electric wiring design to make the optimum use of the conductors of the available electric cables. The use of different parts of a conductor of a cable in different circuits, while maintaining the integrity of each circuit and thereby achieving optimum use of all the cable conductors is possible with the plug socket of this invention.

Accordingly, the invention provides a plug socket having two separable body parts housing at least five terminal members adapted to be connected to corresponding conductors of cables so as to join said cables each terminal member having fixed to it a pair of spring contact fingers each pair being aligned with an opening in at least one of the body parts to permit the pin of a plug inserted thereinto to engage said pair of contact fingers to connect the corresponding conductor to external circuitry or an appliance, at least one of said terminal members being in two parts electrically connectable and disconnectable by switching means.

The invention is described with reference to the accompanying drawings in which

FIG. 1 is an exploded perspective view of the plug socket parts

FIG. 2 is a plan view of the bottom half of the plug socket

FIG. 3 is a sectional view on line 3—3 of FIG. 2

FIG. 4 is a sectional view of an assembled plug socket on line 4—4 of FIG. 2

FIG. 5 is a view in the direction 5—5 of FIG. 4 showing a switching assembly

FIG. 6 is a perspective view of a switching assembly cam for use in the assembly of FIG. 5

FIG. 7 is a sectional view on line 7—7 of FIG. 6, and

FIG. 8 is a fragmentary view of a terminal member mounted in an assembled plug socket.

Referring to FIG. 1 the plug socket comprises a top 1 and a bottom 2 having square body portions 3 and 4 respectively and hollow flared ends 5 which, when the body parts are assembled provide flared inlets for cables. The body portions have holes 6 therein whereby they can be secured together as for example by thread cutting screws. The surface 7 of the bottom 2 is provided with cavities to receive terminal members and the body top and bottom has openings 8 to receive the pins of plugs (not shown) engageable in contacts on the terminal members. Holes 9 are provided in the socket top 1 and the bottom 2 to rotatably support spindle ended switching members 10.

The terminal members 11, 12, 13, 14 and 15 are each constructed from a length of metal tubing, flattened intermediate its ends to form body parts 11a, 12a, 13a, 14a and 15a the ends being left tubular to receive the ends of conductors of multi-strand cables.

The terminal member 11 has a pair of shaped leaves 16 riveted to its body 11a and the two pair of spring contact fingers thus formed fit into cavities 17 provided therefor in the socket top 1 and bottom 2.

The tubular ends of the member 11 are received in recesses 18 in the socket bottom 2 joined by a slot 19 which receives the body part 11a of the member 11.

The member 12 with its spring contact fingers 20 is received in cavities recesses and slot 21, 22 and 23 respectively in the socket bottom 2.

The member 13 is similar to members 11 and 12 having spring contact fingers 24 and being received into cavities recesses and slot 25, 26 and 27 respectively.

Members 14 and 15 are constructed in a manner similar to members 11 to 13, except that they are bent and they are received in cavities recesses and slots 28 to 30 and 31 to 33 respectively in the socket bottom 2. The spring contact fingers 34 and 35 of the members 14 and 15 are at right angles to the other contact fingers.

Another pair of spring fingers 36 is housed in a cavity 37 in the socket bottom 2 and is joined to the spring fingers 24 by a bridge 38 received in a cavity 39 in the socket bottom 2. The bridge 38 lies below the body of the member 14 as the cavity 39 is deeper than the slot 30.

Terminal members 40 and 41 are each comprised of two lengths of flattened tube to provide bodies 40a and 40b and 41a and 41b with tubular conductor receiving ends. The body parts 40a—40b and 41a—41b are each joined by a pair of conductive spring fingers 42 and 43. The slots in the socket bottom to receive the members 40 and 41 are enlarged at 44 and 45 to receive the spring fingers 42 and 43 respectively.

The holes 9 in the socket top 1 and bottom 2 are aligned with the enlargements 44 and 45 and counterbores 46 are provided in the holes 9.

The switching members 10 each include spindle ends 47, received in the holes 9, enlarged cylindrical parts 48, received in counterbores 46 and a diamond cross-sectioned center 49 between the cylindrical parts 48.

The diamond shaped centers 49 are each disposed between a pair of spring fingers 42 or 43 and are dimensioned so that with the minor axis of the diamond transverse to the long axis of the member 40 or 41 the spring fingers remain in contact with the parts 40a and 41a. The major axis of the diamond is dimensioned to separate the respective spring fingers when the switching member 10 is rotated through 90°. The spindle ends 47 are slotted to receive a screw driver blade to facilitate the rotation of the switching members 10. The slotted ends 47 may be below the outer surfaces of the socket top 1 and bottom 2.

As illustrated the plug socket is designed for use with a maximum of seven conductors in each cable. The plug pin openings 8 are designated E for earth, N for neutral link, A for active link, L1 and L2 which are the interruptable conductors. Plugs may be inserted from one or both sides of the socket to selectively connect the conductors in the socket to external circuitry or appliances. The orientation of the openings 8 and the various plug pin receiving spring contact fingers is optional but for practical reasons e.g. universal plugs for insertion for either side of the socket, they are arranged as illustrated.

It will be understood that the body of the socket can be greatly lightened and be made more economically if all surplus material is removed from the body parts 1 and 2. In such a form it could be readily injection moulded.

I claim

1. A junction box with plug receiving power outlets, said junction box comprising a body of separable parts, oppositely disposed cable inlet and outlet openings in said body, at least five cable connectors arranged in said body, a terminal at each end of each connector for connecting corresponding conductors of the inlet and outlet cables respectively, said body having plug pin receiving slots on opposite sides thereof, a plurality of pairs of spring contacts aligned with said plug pin receiving slots, at least one such pair of spring contacts being fixed to each connector, at least one of said connectors being formed of two parts, externally operable switching means to electrically connect or disconnect said connector parts and the cable conductors connected thereto, said switching means comprising a pair of contact springs fixed to one part of the two part connector, said contact springs being biased for contact with the other of said connector parts and a spindle passing between said biased contact springs, the part of said spindle passing therebetween being of diamond cross section, the bigger axis of said spindle part being greater than the distance between said contact springs in the rest position.

2. The junction box claimed in claim 1, wherein one of the body parts has cavities to receive said connectors, both of said body parts have cavities which are aligned and receive said switch means and cavities which are aligned and receive said spring contacts.

3. The junction box claimed in claim 1, having an additional pair of spring contacts electrically connected with the spring contacts on one of said connectors and being supported in aligned cavities in said body, and additional slots on opposite sides of said body aligned with said additional spring contacts to provide external access thereto.

4. The junction box claimed in claim 1, wherein at least one of the connectors is cranked and wherein the spring contacts are fixed to the cranked part of the connector.

5. The junction box claimed in claim 1, wherein the body parts are injection molded in a plastic material.

6. A junction box comprising two separable interengageable parts, each end of each part having a notch therein, corresponding notches of the two parts combining to form a cable receiving inlet and a cable outlet for the junction box, the inlet and outlet being disposed and substantially in alignment, at least five cable connectors disposed in the junction box and orientated in the same general direction as the cable inlet-outlet alignment, each connector comprising an elongated body portion with a terminal at each end for the permanent connection of a conductor of an inlet or outlet cable, recesses in one junction box part in which said connectors are housed so that all the terminals of the connectors are in substantially the same plane and corresponding terminals are substantially aligned, at least one contact set comprising a pair of spring contacts fixed intermediate their ends to the elongated part of each connector so as to lie substantially at right angles to the place of the terminals and extend in opposite directions beyond the connector, plug pin receiving slots on opposite sides of the junction box respectively aligned with the ends of the contact sets, at least one of said connectors being formed in two parts and individually operable isolating means for each two part connector to permit the electrical connection or disconnection of said connector parts and thereby the cable conductors connected to the terminal thereof, all of said isolating means being housed within the junction box and being accessible for external manual operation from both of said opposite sides of said junction box.

7. A junction box with plug receiving power outlets, said junction box comprising a body of two separable parts, oppositely disposed cable inlet and outlet openings in said body, at least five cable connectors housed within the said body, a terminal at each end of each connector for connecting corresponding conductors of inlet and outlet cables respectively, said body having plug pin receiving slots on opposite sides thereof respectively aligned with pairs of spring contacts, at least one such pair being fixed to each connector, at least one of said connectors being formed of two parts, and individually operable isolating means to electrically connect or disconnect said connector parts and thereby the cable conductors connected thereto, each isolating means comprising a pair of contact springs fixed to one part of the two part connector, said contact springs being biassed for contact with the other of said connector parts and a spindle passing between said biassed contact springs, the part of the spindle passing therebetween being of diamond cross-sectional shape, the bigger axis of the diamond being greater than the distance between said contact springs in the rest position.

* * * * *